United States Patent [19]

Faasse

[11] Patent Number: 5,667,118
[45] Date of Patent: Sep. 16, 1997

[54] PANNIERS RACK

[76] Inventor: James P. Faasse, 1946 Martindale, Wyoming, Mich. 49509

[21] Appl. No.: 685,089

[22] Filed: Jul. 23, 1996

[51] Int. Cl.$^6$ ................................ B62J 7/00; B62J 9/00; B62J 11/00

[52] U.S. Cl. ................. 224/430; 224/419; 224/422; 224/424; 224/428; 224/429; 224/448; D12/407

[58] Field of Search ..................... 224/39, 419, 422, 224/423, 424, 428, 429, 430, 441, 447, 448; D12/410, 407

[56] References Cited

U.S. PATENT DOCUMENTS

| | | |
|---|---|---|
| 639,708 | 12/1899 | Certain . |
| 1,105,435 | 7/1914 | Howell . |
| 4,402,439 | 9/1983 | Brown ................................ 224/32 R |
| 4,450,988 | 5/1984 | Meisel ................................ 224/32 A |
| 4,460,115 | 7/1984 | Jackson ............................. 224/32 R |
| 4,487,344 | 12/1984 | Blackburn et al. ................. 224/39 |
| 4,658,998 | 4/1987 | Belka ................................. 224/39 |
| 4,759,481 | 7/1988 | Belka ................................. 224/39 |

*Primary Examiner*—Henry J. Recla
*Assistant Examiner*—Timothy L. Maust
*Attorney, Agent, or Firm*—Price, Heneveld, Cooper, DeWitt & Litton

[57] ABSTRACT

A bicycle rack for supporting panniers includes first and second laterally spaced apart frames connected to each other by a substantially U-shaped yoke. Each of the frames includes a clamp which is configured to grip a bifurcation of a steering fork of a bicycle. Each frame also includes a transverse member having a flange with an upper edge of the flange defining at least one notch for engaging an axle of the front wheel of the bicycle. The rack can be quickly and easily mounted, dismounted and remounted as desired on the same or on different bicycles. The panniers rack of the invention eliminates the need for special mounting features and does not require any permanent modifications which would alter the appearance of the bicycle.

9 Claims, 3 Drawing Sheets

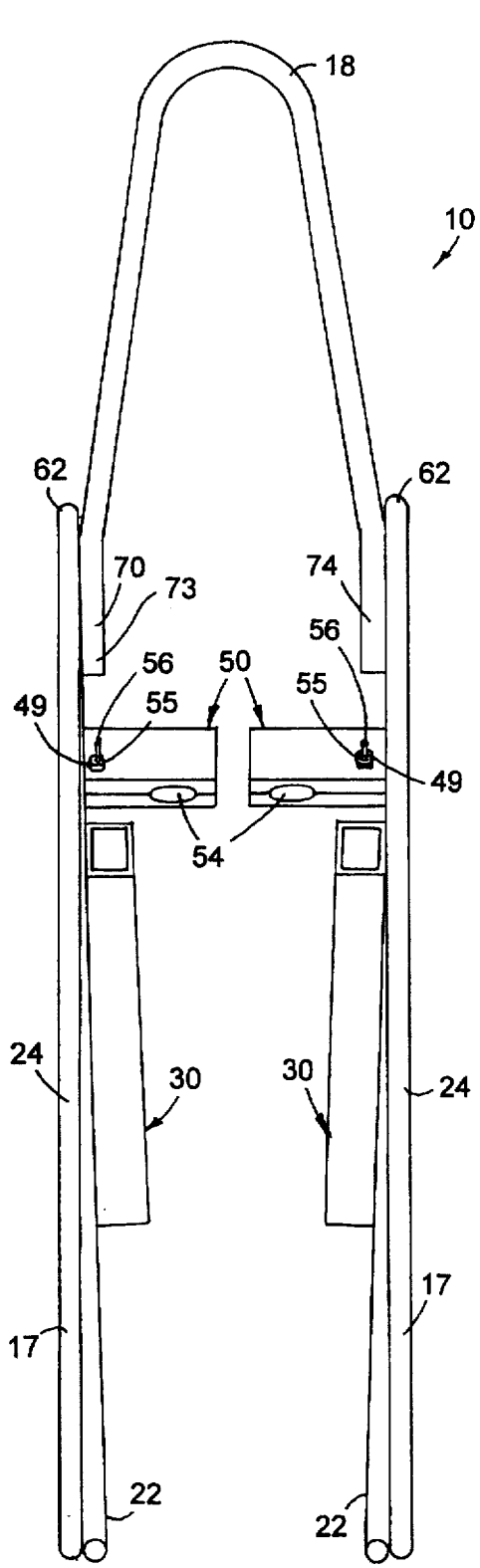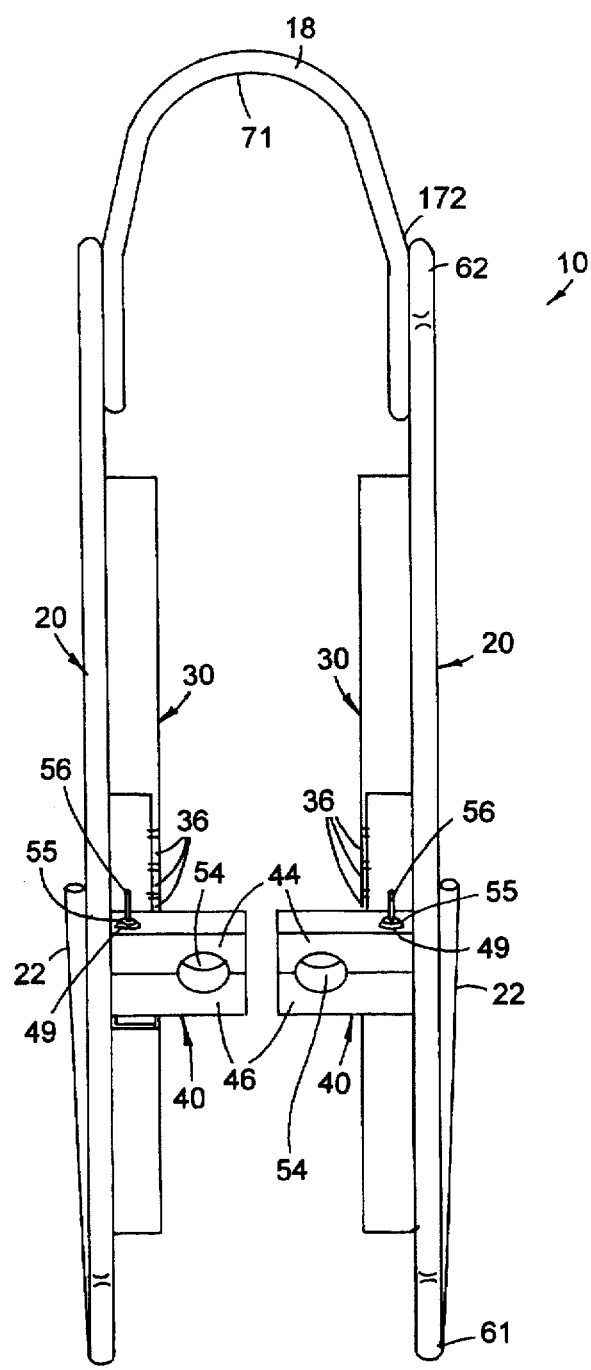
Fig. 3
Fig. 2

PANNIERS RACK

FIELD OF THE INVENTION

This invention relates generally to panniers racks for bicycles, and more particularly to a panniers rack which can be quickly and easily mounted over the front wheel of a bicycle and which can be used for supporting any of a variety of bags, containers or other objects.

BACKGROUND OF THE INVENTION

Panniers racks which can be mounted over the front wheel of a bicycle are well known. Such racks have generally comprised a pair of laterally spaced apart rigid frames connected by a generally U-shaped yoke or brace. When the panniers rack is mounted on a bicycle, the rigid frames are typically positioned on opposite sides of the front wheel, and the U-shaped brace extends generally upwardly from one of the frames, over the wheel, and downwardly to the other frame. Conventional panniers racks are usually secured at a plurality of locations on each of the bifurcations of the steering fork using special mountings which are permanent features of the steering fork. For example, U.S. Pat. No. 639,708 discloses a parcel-carrier for bicycles which includes a frame having a plurality of slots which are engaged by support hooks mounted on the steering fork. The hook and slot arrangement allows the parcel-carder to be quickly and easily removed from the bicycle, but requires permanent mounting of the hooks to the steering fork. Mounting of the hooks to the steering fork can be difficult and time consuming and detract from the aesthetics of the bicycle when the parcel-carder is removed.

U.S. Pat. Nos. 4,450,988; 4,487,344 and 4,658,998 each disclose panniers carriers which are either bolted or clamped to an upper end of each of the bifurcations of the steering fork, and bolted to an apertured lug on the lower end of each of the bifurcations. Accordingly, attachment of the panniers rack described in these patents requires a specially manufactured or modified steering fork having apertured lugs. The addition of apertured lugs to an existing steering fork can be difficult and will permanently alter the aesthetics of the bicycle. A further disadvantage is that dismounting and remounting of the panniers rack disclosed in these patents requires complete removal and replacement, respectively, of a plurality of nuts and bolts. Therefore, these patents do not disclose panniers racks which are especially easy to install and remove when desired.

U.S. Pat. No. 4,460,115 discloses an apparatus for carrying panniers on opposite sides of the front wheel of the bicycle. The apparatus is said to be designed so that it can be easily installed or removed from the bicycle without tools. However, the apparatus is of extremely limited utility. Specifically, the apparatus, which generally comprises a U-shaped bar member having a bracket attached to each end thereof, does not include a framework onto which a variety of bags, containers or other objects can be supported, but instead must be used with a bag which is specially adapted to cooperate with the apparatus to form a support structure. More specifically, the apparatus can only be used with a specially designed bag having a rigid stiffener panel and a plurality of fastening means connected to the stiffening panel.

A further disadvantage with the known panniers racks is that they offer little, if any, adjustability to facilitate proper mounting thereof on a variety of bicycles having different shaped steering forks. In particular, the location of the fastening elements on the known racks are generally fixed. As a result, known panniers racks adapted to be properly mounted on a particular bicycle, may not be capable of being properly mounted on another bicycle having a steering fork which is either straighter or more arcuate than the steering fork for which the rack is designed.

SUMMARY OF THE INVENTION

This invention provides a panniers rack which can be quickly and easily mounted, dismounted and remounted as desired on the same or different bicycles. The rack does not require that the bicycle be provided with any special mounting features, and therefore does not require any modifications which would permanently alter the appearance of the bicycle. The panniers rack of this invention can also include features which allow adjustable mounting of the rack to the axle of the front wheel and to the bifurcated front steering fork of generally any bicycle.

The rack comprises first and second laterally spaced apart frames which are connected to each other by a substantially U-shaped yoke. Each of the frames includes a clamp which is configured to grip one of the bifurcations of the steering fork of a bicycle. Each frame also includes a cross member having a flange with at least one notch for engaging the axle of the front wheel of the bicycle.

BRIEF DESCRIPTION OF THE DRAWINGS

FIG. 2 is a top plan view of the panniers rack shown in FIG. 1;

FIG. 3 is a front elevational view of the panniers rack shown in FIG. 1;

DESCRIPTION OF THE PREFERRED EMBODIMENT

Figure 1:
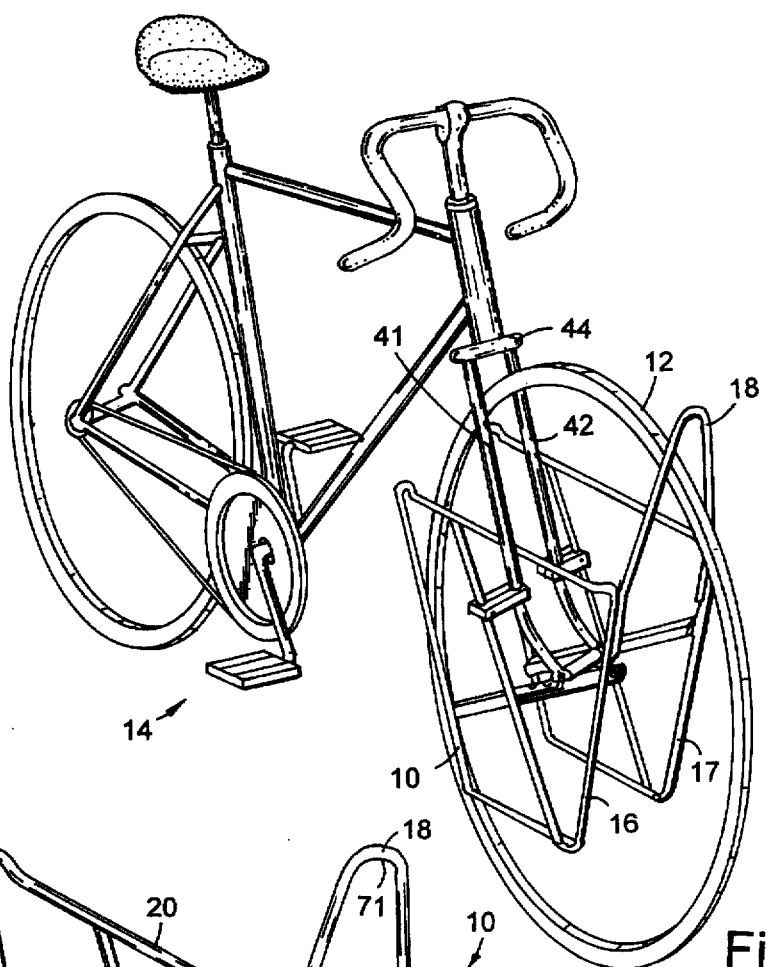
FIG. 1 is a perspective view of a panniers rack in accordance with the invention mounted on a bicycle.
Figure 4:
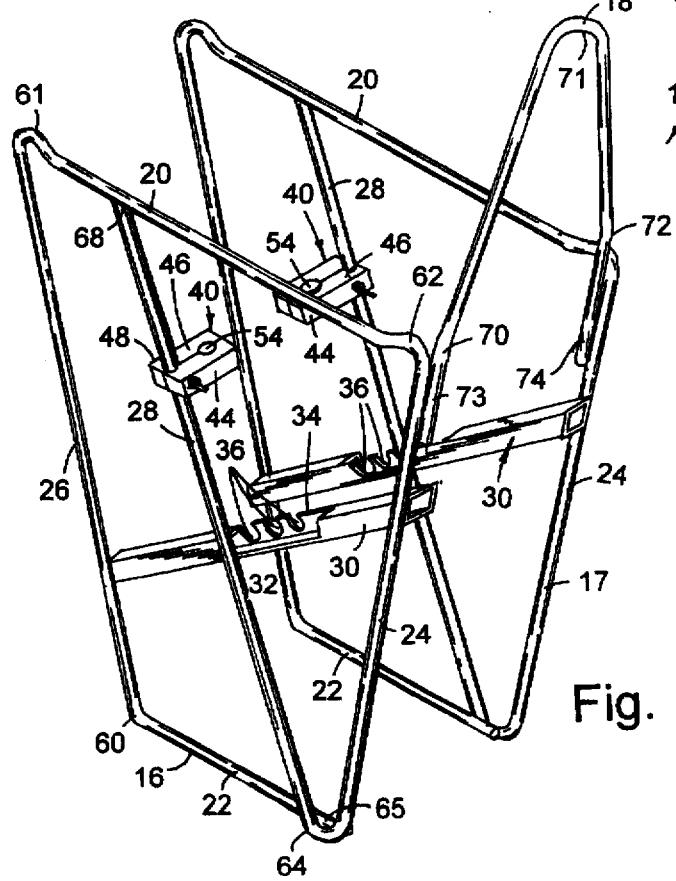
FIG. 4 is a perspective view of the panniers rack shown in FIG. 1, which is not mounted on a bicycle.

Shown in FIG. 1 is a panniers rack 10 in accordance with the invention which is mounted over the front wheel 12 of a bicycle 14. Panniers rack 10 is generally comprised of first and second laterally spaced apart frames 16 and 17 respectively, and a substantially U-shaped yoke 18 which connects frames 16 and 17 together. With reference to FIGS. 2, 3 and 4 it can be seen that frames 16 and 17 generally lie in parallel spaced apart planes. Each of the frames 16, 17 is generally comprised of an upper member 20, a lower member 22, forward side member 24 and rearward side member 26. The upper and lower members 20, 22 are approximately parallel to each other and assume an approximately horizontal orientation when properly mounted on a bicycle. Sides members 22 and 24 connect the upper member 20 and lower member 22 to form a continuous rigid frame. Each frame is preferably provided with a cross member 28 to increase the rigidity and structural integrity of the frames 16 and 17. Cross member 28 is connected to an upper portion of the frame and a lower portion of the frame, and is generally disposed between the side members 24 and 26. Frames 16 and 17 each include a transverse member 30 which is connected to each of the side members 24 and 26, and which is generally disposed between the upper member 20 and the lower member 22. Transverse member 30 includes a generally vertically arranged flange 32 having an upper edge 34 defining a plurality of upwardly opening notches 36. In the illustrated embodiment, transverse member 30 is conveniently formed from a length of tube having a square cross-sectional shape. Transverse member 30 is prepared from the square tubing by cutting out two adjacent side walls of the tube between the ends thereof so that a portion of the tube between the ends thereof has an L-shaped cross section which defines vertical flange 32 and an adjacent horizontal flange 38. Upwardly opening notches 36 can then be cut into the vertical flange 32. The upwardly opening notches 36 are preferably defined by a pair of substantially parallel sides which form an acute angle with respect to a vertical line, whereby one of the sides is engagable with an upper half of the surface of a front wheel axle of a bicycle when the rack is properly mounted on the bicycle. More specifically, the upwardly opening notches 36 are preferably angled so that the weight of the rack and any panniers (e.g., open-ended baskets, saddle bags, packs or the like) suspended from the rack will bear upon the axle of the front wheel of the bicycle.

Each of the frames 16 and 17 further includes a clamp 40 which is configured to grip one of the bifurcations 41, 42 of a steering fork 44 of bicycle 14. In the illustrated embodiment, clamp 44 comprises a pair of cooperating clamp blocks 44 and 46, which when arranged abuttingly together define a first through bore 48 having internal walls which grippingly engage cross member 28 when blocks 46 and 47 are urged together by tightening nut 49 on threaded screw 50 passing through bore 52 which is generally perpendicular to the direction of bore 48. Clamp blocks 46 and 47 also define a through bore 54 having internal side walls which engage one of bifurcations 41, 42 when clamp 40 is properly assembled as shown in the drawings and nut 55 is tightened onto screw 56 which passes through a bore 57 which is generally perpendicular to the direction of bore 54. In order to facilitate mounting and dismounting of rack 10 without scratching or otherwise damaging the bifurcations 41, 42, clamp 40 is preferably made of a relatively strong and tough material which has a non-abrasive, relatively soft surface. Thermoplastic materials are generally preferred, with a particularly suitable material for forming the clamps 40 being nylon. While the illustrated embodiment is comprised of a pair of clamp blocks which are held together by a pair of nuts and bolts, it is contemplated that various other clamps having quick release and quick fastening means can be employed, such as clamps having toggle bolts, alligator type clips, etc.

While it is conceivable that a suitable panniers rack in accordance with the invention can be provided with clamps 40 which are permanently fixed to frames 16 and 17, and that each of the transverse members 30 can be provided with a single notch 36, whereby the panniers rack 10 can be properly mounted on a particular bicycle for which the rack is adapted so that the upper member 20 and lower member 22 are arranged horizontally or approximately horizontally, it is preferred that clamps 40 be releasably securable to, and repositionable on, frames 16, 17, and that transverse member 30 be provided with a plurality of notches 36 so that panniers rack 10 can be mounted on generally any bicycle irrespective of the curvature of the bifurcations 41 and 42.

The frames 16 and 17, and yoke 18 of panniers rack 10 are preferably made of a relatively light-weight, but strong and rigid material. Additionally, the materials used to fabricate the frames 16, 17 and yoke 18, should be resistant to corrosion. A suitable and preferred material is aluminum.

With the illustrated embodiment, each of the frames 16 and 17 is fabricated from a single length of solid aluminum rod and a single length of aluminum tubing having a square transverse cross section. In particular, frames 16 and 17 are prepared by bending an aluminum rod at locations 60, 61, 62, 63 and 64, and by heliarc welding a first end 65 of the aluminum rod to the segment of the rod between bends 63 and 64 and by heliarc welding the other end 68 to the segment of aluminum rod located between bends 61 and 62. A section of aluminum tubing having a square cross section is cut to provide vertical flange 32 and notches 36 as described above. The ends of the tub are then appropriately cut to conform with the shape of the frame, and the ends thereof are heliarc welded to the side members 24 and 26. Yoke 18 is also formed from a length of aluminum rod which is appropriately bent at locations 70, 71 and 72 as shown in the drawings to form a substantially U-shaped member. End segments 73 and 74 of yoke 18 are then connected to laterally spaced apart frame members 16 and 17 by heliarc weldments.

Figure 5:
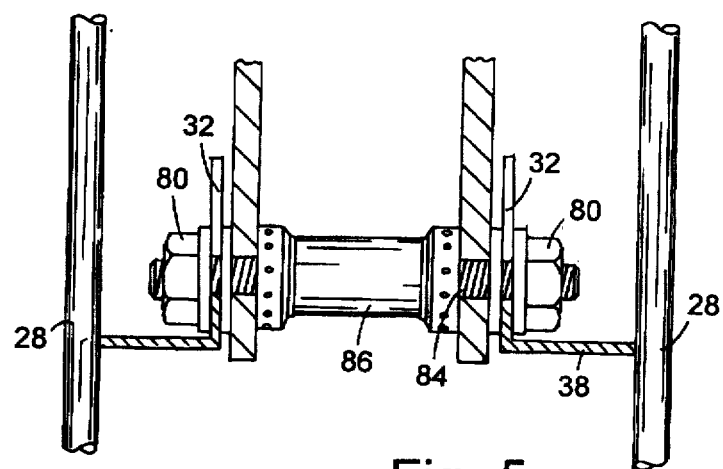
FIG. 5 is an enlarged fragmentary front elevational view of the panniers rack of FIGS. 1–4, in partial cross section.

Panniers rack 10 is easily mounted to a bicycle. Referring to FIG. 5, the front wheel securement device 80, which can be a quick release mechanism having a handle or which can be a nut or other device for securely holding the front wheel axle 84 onto bifurcations 41 and 42, is loosened so that flanges 32 of frames 16 and 17 can be positioned between wheel hub 86 and securement device 80 with the sides of one of the notches 36 engaging axle 84. After the frames have been properly positioned with the sides of the notches 36 engaging the axle 84, frames 16 and 17 are clamped to bifurcations 41 and 42 by positioning clamp blocks 46 and 47 together in an appropriate manner so that clamp blocks 46 and 47 together define through bores 48 and 54 which engage bifurcations 41 or 42 and transverse members 30, respectively. After clamps 40 have been properly positioned and the appropriate notch 36 has been selected so that upper and lower members 20 and 22 are approximately horizontally arranged, clamp blocks 46 and 47 of clamps 40 are tightly urged together such as by tightening nuts 49 and 55 onto screws 50 and 56. Thereafter, wheel securement device 80 is tightened so that flanges 32 are firmly held in place between the lower end of the bifurcations 41 and 42 and the wheel securement device.

Figure 6:
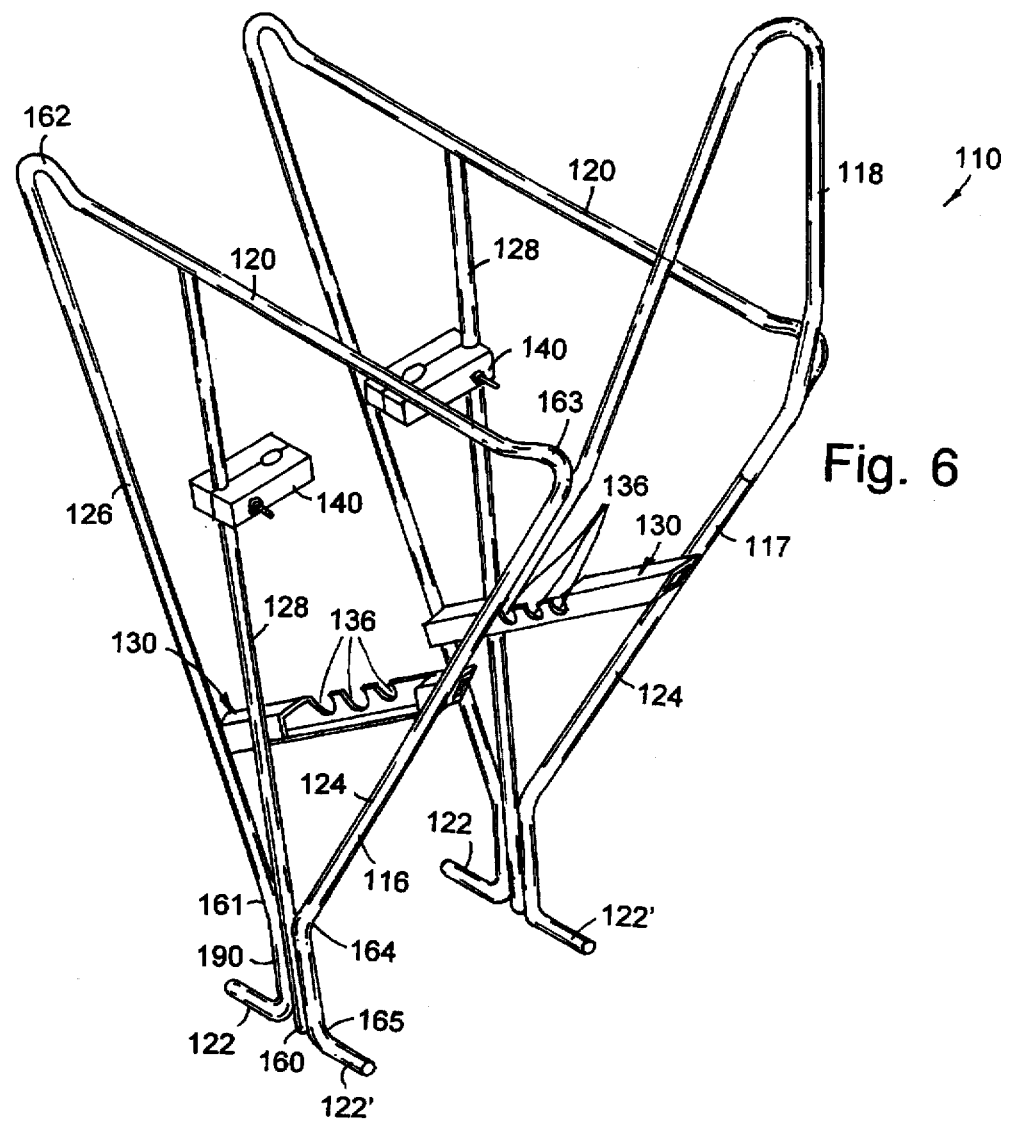
FIG. 6 is a perspective view of an alternatively embodiment of the invention.

In FIG. 6, there is shown an alternative embodiment 110 of the invention, wherein the frames 116, 117 are triangular shaped. Frames 116 and 117 include an upper member 120, lower members 122 and 122', side members 124 and 126, cross member 128, and transverse member 130. Frames 116 and 117 are joined together by U-shaped yoke 118. Each of the frames 116 and 117 of panniers rack 110 is fabricated by bending a first aluminum rod at locations 160, 161,162, 163, 164 and 165 as shown in FIG. 6. Another length of aluminum rod constituting cross member 128 is heliarc welded at one end to upper member 120 and heliarc welded at the other end to lower portions 190, 191 of side members 24 and 26. Yoke 118 is substantially identical to yoke 18 and is joined to frames 116 and 117 in substantially the same manner as set forth above with respect to panniers rack 10. The other remaining features of the alternative panniers rack 110, such as the cross member 128, notches 136 and clamp 140 are substantially the same as the corresponding parts of panniers rack 10 described above.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A bicycle rack for supporting panniers, comprising:

first and second laterally spaced apart frames connected to each other by a substantially U-shaped yoke;

each of the frames including a clamp configured to grip a bifurcation of a steering fork of a bicycle;

each frame further including a transverse member having a flange, an upper edge of the flange defining at least one notch for engaging an axle of the front wheel of the bicycle.

2. The rack of claim 1, wherein each of the frames comprises an upper member, a lower member, and a pair of side members which connect the upper member to the lower member to form a rigid frame.

3. The rack of claim 2, wherein the upper and lower members are approximately parallel to each other.

4. The rack of claim 3, further comprising a cross member connected to an upper end of the frame and to a lower end of the frame, the cross member being generally disposed between the side members.

5. The rack of claim 1, wherein the transverse member is connected at opposite ends thereof to the side members, and wherein the transverse member is disposed between the upper and lower members.

6. The rack of claim 1, wherein the upper edge of the flange defines a plurality of upwardly opening notches.

7. The rack of claim 6, wherein the upwardly opening notches are defined by a pair of substantially parallel sides which form an acute angle with respect to a vertical line, whereby one of the sides is engagable with an upper half of the surface of a front wheel axle of a bicycle when the rack is properly mounted on a bicycle.

8. The rack of claim 1, wherein the clamp is made of plastic to prevent scratching or other damage to the bifurcations of the steering fork of a bicycle.

9. The rack of claim 8, wherein the plastic is nylon.

* * * * *